(12) United States Patent
Pirzadeh et al.

(10) Patent No.: US 10,454,693 B2
(45) Date of Patent: Oct. 22, 2019

(54) MOBILE PAYMENT APPLICATION ARCHITECTURE

(75) Inventors: Kiushan Pirzadeh, Foster City, CA (US); Marc B. Kekicheff, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 188 days.

(21) Appl. No.: 12/892,328

(22) Filed: Sep. 28, 2010

(65) Prior Publication Data

US 2011/0078081 A1     Mar. 31, 2011

Related U.S. Application Data

(60) Provisional application No. 61/247,507, filed on Sep. 30, 2009.

(51) Int. Cl.
    *H04L 12/14*     (2006.01)
    *G06Q 20/20*     (2012.01)
    (Continued)

(52) U.S. Cl.
    CPC .............. *H04L 12/14* (2013.01); *G06F 21/78* (2013.01); *G06Q 20/20* (2013.01); *G06Q 20/32* (2013.01);
    (Continued)

(58) Field of Classification Search
    CPC .............. G06Q 20/105; G06Q 20/204; G06Q 20/3223; G06Q 20/327; G06Q 20/12; G06Q 20/3226; G06Q 20/325; G06Q 20/3278; G06Q 20/357; G06Q 20/425; G06Q 20/02; G06Q 20/202; G06Q 20/223; G06Q 20/3229; G06Q 20/352; G06Q 20/355; G06Q 20/3563; G06Q 20/363; G06Q 20/385; G06Q 20/042; G06Q 20/045;
    (Continued)

(56) References Cited

U.S. PATENT DOCUMENTS 6,404,859 B1 *  6/2002  Hasan ................. 379/88.04
7,107,078 B2    9/2006  Lehto
(Continued)

FOREIGN PATENT DOCUMENTS

CN     1853189     10/2006
CN     101261709 A  9/2008
(Continued)

OTHER PUBLICATIONS

Smart Card Alliance. "The Mobile payments and NFC Landscape: A U.S. Perspective." A Smart Card Alliance Payment Council White Paper. Publication No. PC-11002. Publication Date: Sep. 2011.*
(Continued)

*Primary Examiner* — Virpi H Kanervo
(74) *Attorney, Agent, or Firm* — Kilpatrick Townsend & Stockton LLP

(57) ABSTRACT

A system, apparatus, and method for conducting payment transactions using a mobile device. Embodiments of the invention are directed to an architecture or system design for the functional elements residing in a mobile device that may be used to conduct a payment transaction. The inventive architecture may be implemented as a set of functional modules resident in a secure element that is embedded or otherwise incorporated into the mobile device.

22 Claims, 5 Drawing Sheets

(51) Int. Cl.
*G06Q 20/32* (2012.01)
*G06Q 20/40* (2012.01)
*G06F 21/78* (2013.01)

(52) U.S. Cl.
CPC ..... *G06Q 20/3226* (2013.01); *G06Q 20/3227* (2013.01); *G06Q 20/3229* (2013.01); *G06Q 20/3278* (2013.01); *G06Q 20/40* (2013.01); *H04L 12/1467* (2013.01)

(58) Field of Classification Search
CPC ............ G06Q 20/108; G06Q 20/3221; G06Q 20/3274; G06Q 20/342; G06Q 20/351; G06Q 20/3552; G06Q 20/3574; G06Q 20/3576; G06Q 20/35765; G06Q 20/367; G06Q 20/3672; G06Q 20/382; G06Q 20/38215; G06Q 20/3823; G06Q 20/3827; G06Q 20/401; G06Q 20/4033; G06Q 20/4037; G06Q 20/40975; G06Q 30/06; G06Q 30/0213; G06Q 30/0222; G06Q 30/0255; G06Q 30/0601; G06Q 40/02
See application file for complete search history.

(56) References Cited

U.S. PATENT DOCUMENTS

| | | | |
|---|---|---|---|
| 7,357,309 B2 | 4/2008 | Ghosh et al. | |
| 7,374,079 B2 | 5/2008 | Nam et al. | |
| 7,552,094 B2 | 6/2009 | Park et al. | |
| 2001/0030233 A1* | 10/2001 | Asoh et al. | 235/382 |
| 2002/0073241 A1 | 6/2002 | Gilbert et al. | |
| 2005/0108486 A1* | 5/2005 | Sandorfi | 711/162 |
| 2005/0246187 A1* | 11/2005 | Maltzman | 705/1 |
| 2005/0250538 A1 | 11/2005 | Narasimhan et al. | |
| 2006/0106701 A1* | 5/2006 | Ayala et al. | 705/35 |
| 2007/0295803 A1* | 12/2007 | Levine | G06Q 20/04 235/379 |
| 2008/0010190 A1 | 1/2008 | Rackley, III et al. | |
| 2008/0027815 A1 | 1/2008 | Johnson et al. | |
| 2008/0051059 A1 | 2/2008 | Fisher | |
| 2008/0147509 A1* | 6/2008 | Ghosh et al. | 705/17 |
| 2008/0154770 A1* | 6/2008 | Rutherford et al. | 705/44 |
| 2008/0167000 A1 | 7/2008 | Wentker et al. | |
| 2008/0167017 A1 | 7/2008 | Wentker et al. | |
| 2008/0167961 A1 | 7/2008 | Wentker et al. | |
| 2008/0270301 A1 | 10/2008 | Jones et al. | |
| 2008/0275779 A1 | 11/2008 | Lakshminarayanan | |
| 2009/0037326 A1 | 2/2009 | Chitti et al. | |
| 2009/0070272 A1 | 3/2009 | Jain | |
| 2009/0127333 A1 | 5/2009 | Chamley et al. | |
| 2009/0164375 A1* | 6/2009 | Saunders et al. | 705/44 |
| 2009/0199206 A1 | 8/2009 | Finkenzeller et al. | |
| 2009/0254440 A1 | 10/2009 | Pharris | |
| 2009/0298427 A1 | 12/2009 | Wilkinson et al. | |
| 2009/0300351 A1* | 12/2009 | Lei et al. | 713/165 |
| 2010/0063893 A1* | 3/2010 | Townsend | 705/26 |
| 2010/0191633 A1* | 7/2010 | Nuzum et al. | 705/35 |
| 2013/0018742 A1* | 1/2013 | Fisher | 705/21 |

FOREIGN PATENT DOCUMENTS

| | | | | |
|---|---|---|---|---|
| CN | 101393672 A | | 3/2009 | |
| EP | 1 798 867 A2 | | 6/2007 | |
| GB | 2 457 257 A | | 8/2009 | |
| KR | 10-2005-006682 A | | 5/2005 | |
| KR | 10-2009-010058 A | | 9/2009 | |
| RU | 2324979 C2 | | 5/2008 | |
| WO | 2009/087539 A1 | | 7/2009 | |
| WO | 2009/138848 A2 | | 11/2009 | |
| WO | WO-2010038611 A1 * | | 4/2010 | |
| WO | WO-2010138611 A1 * | | 12/2010 | G06Q 20/02 |

OTHER PUBLICATIONS

Smart Card Alliance. "The Mobile payments and NFC Landscape: A U.S. Perspective." A Smart Card Alliance Payment Council White Paper. Publication Number: PC-11002. Publication Date: Sep. 2011.*
International Search Report and Written Opinion dated Apr. 29, 2011 in Application No. PCT/US2010/050770 filed Sep. 29, 2010, 9 pages.
Canadian Patent Application No. 2,776,438, Office Action, dated Apr. 11, 2014.
Chinese Patent Application No. 201080054797.3, Notice on the First Office Action, dated Aug. 18, 2014.
European Patent Application No. 10 821 190.5-1870, Examination Report, dated Sep. 17, 2014.
AU2010300674, "Examiner's Report," dated Mar. 5, 2013, 3 pages.
AU2010300674, "Notice of Acceptance," dated Sep. 5, 2013, 2 pages.
RU2012117227, "Decision on Grant," dated Aug. 14, 2013, 5 pages.
Sun Microsystems, Inc., *Java Card 2.1.1: Application Programming Interface* (May 18, 2000), 219 pages.
CA2,776,438 , "Office Action", dated Apr. 22, 2015, 4 pages.
CN201080054797.3 , "Office Action", dated Apr. 24, 2015, 24 pages.
CN201080054797.3 , "Notice of Decision to Grant", dated May 24, 2016, 4 pages.
CN201080054797.3 , "Office Action", dated Nov. 6, 2015, 6 pages.
EP10821190.5 , "Office Action", dated Mar. 31, 2017, 5 pages.
CN201610642522.0 , "Office Action", dated Jan. 21, 2019, 17 pages.
CN201610642522.0 , "Office Action", dated Aug. 15, 2019, 15 pages.

* cited by examiner

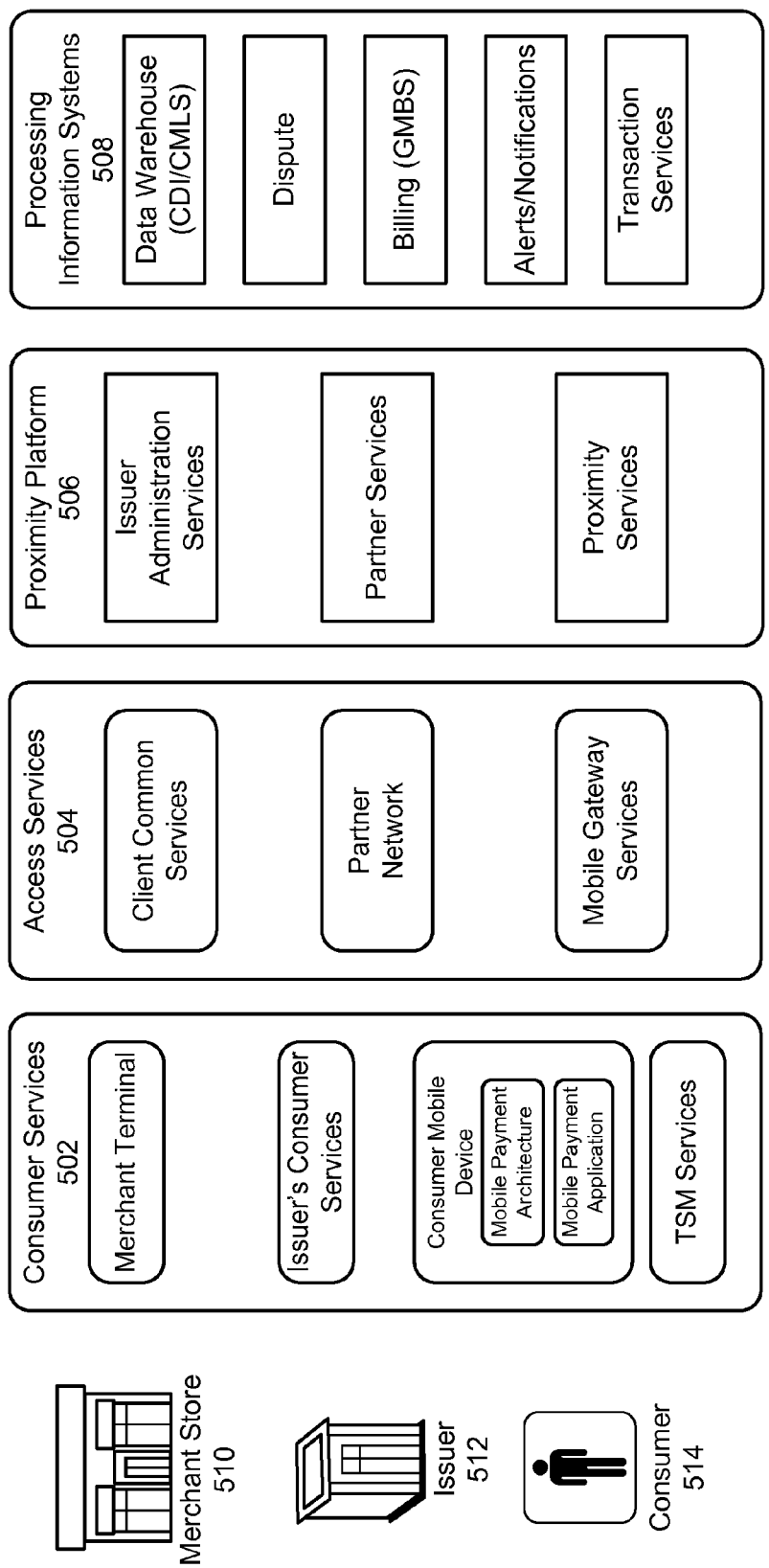

MOBILE PAYMENT APPLICATION ARCHITECTURE

CROSS REFERENCE TO RELATED APPLICATIONS

This application claims priority from U.S. Provisional Patent Application No. 61/247,507, entitled "Mobile Payment Application," filed Sep. 30, 2009, the contents of which is hereby incorporated in its entirety by reference for all purposes.

This application is also related to commonly owned, co-pending patent U.S. application Ser. No. 12/563,421, filed, Sep. 21, 2009, entitled "Over The Air Update Of Payment Transaction Data Stored In Secure Memory", the contents of which is hereby incorporated in its entirety by reference for all purposes.

BACKGROUND

Embodiments of the present invention are directed to systems, apparatuses, and methods for conducting payment transactions using mobile devices, and more specifically, to an architecture or platform for a mobile payment application that may be installed in a mobile client device, such as a mobile phone, personal digital assistant, or portable computing device. Embodiments of the invention provide a set of functional modules to enable a consumer to utilize their mobile device to conduct payment transactions in a secure and efficient manner that can be implemented on a variety of platforms.

Consumer payment devices are used by millions of people worldwide to facilitate various types of commercial transactions. In a typical transaction involving the purchase of a product or service at a merchant location, the payment device is presented at a point of sale terminal ("POS terminal") located at a merchant's place of business. The POS terminal may be a card reader or similar device that is capable of accessing data stored on the payment device, where this data may include identification or authentication data, for example. Data read from the payment device is provided to the merchant's transaction processing system and then to the acquirer, which is typically a bank or other institution that manages the merchant's account. The data provided to the acquirer may then be provided to a payment processing network that is in communication with data processors that process the transaction data to determine if the transaction should be authorized by the network, and assist in the clearance and account settlement functions for the transaction. The authorization decision and clearance and settlement portions of the transaction may also involve communication and/or data transfer between the payment processing network and the bank or institution that issued the payment device to the consumer (the issuer).

Although a consumer payment device may be a credit card or debit card, it may also take the form of a "smart" card or chip. A smart card is generally defined as a pocket-sized card (or other portable payment device) that is embedded with a microprocessor and one or more memory chips, or is embedded with one or more memory chips with non-programmable logic. The microprocessor type card typically can implement certain data processing functions, such as to add, delete, or otherwise manipulate information stored in a memory location on the card. In contrast, the memory chip type card (for example, a prepaid phone card) can typically only act as a file to hold data that is manipulated by a card reading device to perform a pre-defined operation, such as debiting a charge from a pre-established balance stored in the memory. Smart cards, unlike magnetic stripe cards (such as standard credit cards), can implement a variety of functions and contain a variety of types of information on the card. Therefore, in some applications they may not require access to remote databases for the purpose of user authentication or record keeping at the time of a transaction. A smart chip is a semiconductor device that is capable of performing most, if not all, of the functions of a smart card, but may be embedded in another device, such as a mobile phone.

Smart cards or chips come in two general varieties; the contact type and the contactless type. A contact type smart card or chip is one that includes a physical element (e.g., a magnetic stripe or other form of contact) that enables access to the data and functional capabilities of the card, typically via some form of terminal or card reader. A contactless smart card or chip is a device that incorporates a means of communicating with the card reader or point of sale terminal without the need for direct physical contact. Thus, such devices may effectively be "swiped" (i.e., waved or otherwise presented in a manner that results in enabling communication between the contactless element and a reader or terminal) by passing them close to a card reader or terminal. Contactless cards or chips typically communicate with a card reader or terminal using RF (radio-frequency) technology, wherein proximity to the reader or terminal enables data transfer between the card or chip and the reader or terminal. Contactless cards have found uses in banking and other applications, where they have the advantage of not requiring removal from a user's wallet or pocket in order to participate in a transaction. A contactless card or chip may be embedded in, or otherwise incorporated into, a mobile device such as a mobile phone or personal digital assistant (PDA). Further, because of the growing interest in such cards, standards have been developed that govern the operation and interfaces for contactless smart cards, such as the ISO 14443 standard.

A Subscriber Identity Module (SIM) is a security module that may be used for authentication operations in a mobile device (e.g., cellular telephone). SIM hardware typically consists of a microprocessor, ROM, persistent EEPROM memory, volatile RAM, and a serial I/O interface. SIM software typically consists of an operating system, file system, and application programs. The SIM may incorporate the use of a SIM Toolkit (STK), which is an application programming interface (API) for securely loading applications (e.g., applets) or data to the SIM for storage in the SIM and execution by the mobile device. The STK allows a mobile operator (such as a wireless carrier) to create/provision services by loading them into the SIM without changing other elements of the mobile device. One convenient way for loading applications to the SIM is over-the-air (OTA) via the Short Message Service (SMS) protocol.

Secure data or application storage in a smart card or other device may be provided by a Secure Element (SE). The SE can be embedded in the logic circuitry of a mobile device, can be installed in a SIM, or can be incorporated in a removable SD card (secure digital memory card), among other possible implementations. Depending on the type of Secure Element (SE) that hosts an applet, the features implemented by the applet may differ. Although an SE is typically Java Card compliant regardless of its form factor and usage, it may implement features or functions (included in the operating system and/or in libraries) that are specific to that type of SE. For example, a UICC (Universal Integrated Circuit Card) may implement features that are used for network communications, such as text messaging and STK, whereas in certain embedded SE devices, these features may not be implemented.

As the methods and devices used for conducting mobile payments develop, new functions and services will be created, as well as new devices in which those functions and services are implemented. However, to most efficiently enable the development and deployment of such mobile payment functions and services, it is desirable to have a system architecture that can be implemented in a variety of platforms (such as mobile phones that incorporate SIM cards, mobile phones that incorporate secure elements, smart phones, PDAs, etc.). It is also desirable to have a system architecture that interacts with a payment application in a manner that enables updates to the payment application to be performed without compromising the operation of the functional modules used to implement the mobile payment processing functions for the mobile device. It is also desirable to have a system architecture for use in implementing mobile payment methods that provides sufficient security for a consumer's payment account and transaction data, even in the situation where the payment application is updated.

Java Card programs typically use a data format known as an "export file" to provide information about and access to application programming interfaces that are utilized by a routine that is part of an application designed to execute on a platform such as a Secure Element (SE). If the interfaces do not exist on the platform, or if the export file data is not available, then it is not possible to load a Java Card program (i.e., an "applet") onto that platform. For this reason some platforms may be limited in terms of the types of applications or functions that they can support.

What is desired is an architecture or system design for conducting payment transactions on a variety of mobile device platforms that provides sufficient security for a consumer's payment account and payment transaction data, and which interacts with a payment application in a manner that allows for updating the payment application without compromising the operation of other functions of the mobile payment device. Embodiments of the invention address these problems and other problems individually and collectively.

SUMMARY

Embodiments of the present invention are directed to systems, apparatuses, and methods for conducting payment transactions using mobile devices. Specifically, embodiments of the invention are directed to an architecture or system design for the functional elements residing in a mobile device that may be used to conduct a payment transaction. The inventive architecture may be implemented as a set of functional modules resident in a secure element that is embedded or otherwise incorporated into the mobile device. The functional modules may include Java applets (Java card applications that execute under the control of a Java Card Virtual Machine) and Java Classes (definitions for segments of code that may contain both data and functions that may operate on that data) which cooperate to implement the primary functions needed to enable a user (via a mobile payment application user interface) to interact with a mobile payment application installed on the device. Embodiments of the invention provide the capability to implement a mobile payment service on a variety of Java Card platforms and in cooperation with a payment application and payment application user interface that may be updated or altered without impacting the ability of the invention's functional modules to implement the desired functions and operations.

Embodiments of the invention also provide the ability to securely manage a consumer's payment account and payment transaction data while enabling a user and the payment application to interact with that account and transaction data as needed to implement a mobile payment service.

In one embodiment, the present invention is directed to an apparatus for conducting a payment transaction, where the apparatus includes a secure element, a plurality of functional modules installed in the secure element, the plurality of modules including a mobile payment module operative to enable a consumer to conduct a payment transaction, a mobile gateway authentication module operative to mutually authenticate a mobile gateway and the mobile payment module, an over the air communication and data transfer module operative to transfer data and commands to conduct the payment transaction between a cellular network and the apparatus, a process message module operative to convert messages received from the mobile gateway into commands that are executable by other of the plurality of functional modules and to convert responses from the other of the plurality of functional modules into messages that are understood by the mobile gateway, and a multi-access module operative to share data common to a plurality of the consumer's payment accounts between the plurality of functional modules; and a user interface application installed outside of the secure element and operative to generate a user interface to enable the consumer to interact with the mobile payment module.

In another embodiment, the present invention is directed to a method of conducting a payment transaction, where the method includes providing a secure element containing a plurality of functional modules, wherein the functional modules include a mobile payment module operative to enable a consumer to conduct the payment transaction, a mobile gateway authentication module operative to mutually authenticate a mobile gateway and the mobile payment module, an over the air communication and data transfer module operative to transfer data and commands to conduct the payment transaction between a cellular network and an apparatus containing the secure element, a process message module operative to convert messages received from the mobile gateway into commands that are executable by other of the plurality of functional modules and to convert responses from the other of the plurality of functional modules into messages that are understood by the mobile gateway and a multi-access module operative to share data common to a plurality of the consumer's payment accounts between the plurality of functional modules; providing a user interface application external to the secure element and operative to generate a user interface to enable the consumer to interact with the mobile payment module, configuring the multi-access module to generate a separate instance of a multi-access application for each of the plurality of the consumer's payment accounts, configuring the secure element to store shared data common to each of the instances of the multi-access application, and enabling the consumer to interact with the user interface application to operate the mobile payment module and conduct the payment transaction.

Other objects and advantages of the present invention will be apparent to one of ordinary skill in the art upon review of the detailed description of the present invention and the included figures.

BRIEF DESCRIPTION OF THE DRAWINGS

FIG. 5 is a diagram illustrating a possible functional architecture for use in conducting and processing mobile payment transactions that may be used with the inventive mobile payment architecture.

DETAILED DESCRIPTION

Embodiments of the present invention are directed to systems, apparatuses, and methods for conducting payment transactions using mobile devices. Specifically, embodiments of the invention are directed to an architecture or system design for the functional elements residing in a mobile device that may be used to conduct a payment transaction. The inventive architecture for enabling mobile payment transactions permits mobile devices containing a secure element (SE) to conduct contactless payment transactions at a point of sale (POS) terminal. The architecture provides the functionality to manage and maintain the security of the consumer's payment account and payment transaction information, which may be stored either within the SE or in another data storage element of the mobile device. The inventive architecture may be installed directly on the secure element, while a user interface application for a payment module that is used to access the functionality of the components of the architecture may be installed outside of the secure element and in another data storage element of the mobile device. In some embodiments, the inventive architecture provides a set of Application Protocol Data Unit interfaces (APDU, which are data packets exchanged between an applet and a host application that is executing the applet) for interaction with the payment application to enable that application to access and utilize the functionality of the architecture's modules as part of conducting a mobile payment transaction.

In some embodiments, the inventive architecture can be hosted by a secure element (SE) implementation based on Java Card and GlobalPlatform specifications. In one embodiment, the architecture complies with the EMV contactless communications protocol specification 2.0 and is implemented as a Java Card applet (or applets) that runs on the SE. Note that EMV is a standard for the interoperation of IC cards ("Chip cards") and IC capable POS terminals and ATMs, and is used for authenticating credit and debit card payments, where EMV is an acronym for Europay, MasterCard, and Visa, the originators of the standard.

As will be described, the inventive architecture may be implemented as part of, or as a module accessible by a portable consumer payment device, such as a mobile phone, smart card, personal digital assistant (PDA), or laptop computer, among other examples. Thus, although in the following description the present invention will be described with reference to an implementation in a mobile phone, it is understood that other implementation platforms may be used and are considered to be within the possible embodiments of the present invention.

Figure 1:
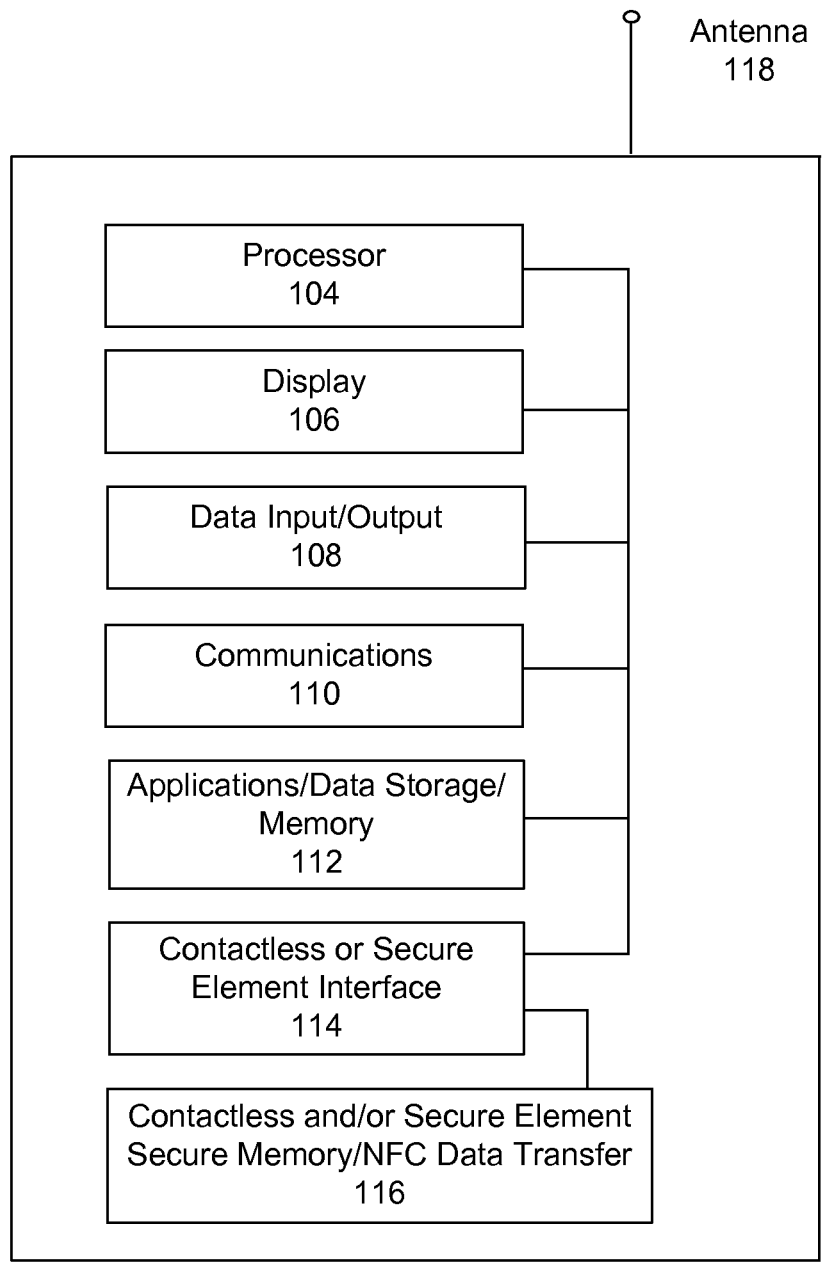
FIG. 1 is a functional block diagram illustrating the primary components of a mobile device, such as a mobile phone in which the inventive mobile payment application architecture may be embedded or otherwise implemented.

FIG. 1 is a functional block diagram illustrating the primary components of a mobile device 102, such as a mobile phone in which the inventive mobile payment application architecture may be embedded or otherwise implemented. As illustrated in FIG. 1, mobile device 102 may include circuitry that is used to enable certain telephony and other device functions. The functional elements responsible for enabling those functions may include a processor 104 (such as an electronic data processor or microprocessor) for executing instructions that implement the functions and operations of the device. Processor 104 may access data storage 112 (or another suitable memory region or element) to retrieve instructions or data used in executing the instructions. Data input/output elements 108 may be used to enable a user to input data (via a microphone or keyboard, for example) or to receive output data (via a speaker, for example). Display 106 may also be used to output data or other forms of information to a user. Communications element 110 may be used to enable data transfer between device 102 and a wireless network (via antenna 118, for example) to assist in enabling telephony and data transfer functions. Device 102 may also include contactless or secure element interface 114 to enable data transfer between contactless and/or secure element 116 and other elements of the device, where contactless and/or secure element 116 may include a secure memory and a near field communications (or other form of short range communications) data transfer element. Note that although a secure element and a near field communications data transfer element are depicted as part of a single module (element 116) in the figure, this is not required for implementation of the present invention, and in some embodiments such elements may be part of separate modules. Note further that a secure element (SE) may include one or more of a secure data storage region, a processing element (such as a CPU or microprocessor capable of executing a set of instructions), or an element capable of executing cryptographic functions, among other components.

Data storage 112 may be a memory that stores data, and may be in any suitable form including a memory chip, etc. Data storage or memory 112 may be used to store data such as user identification or authentication information, user account information, transaction data, etc. Stored financial information may include information such as bank account information, bank identification number (BIN), credit or debit card account number information, account balance information, expiration date, consumer information such as name, date of birth, etc. Note that such data may instead, or also be stored in a secure data storage region that is part of contactless/secure element 116. In some embodiments of the present invention, contactless/secure element 116 serves as the location for the installation of the inventive architecture and for the storage of the consumer's payment account or payment transaction data. As described, data storage 112 may also contain instructions which when executed by processor 104 implement operations or processes that are part of the operation of the device. In one embodiment, such instructions may be used to generate a user interface to enable a user to conduct a mobile payment transaction. The user interface may be displayed using display 106 and the consumer may interact with the interface using data input/output element 108. Such interactions may enable the consumer to activate a payment application, to initiate a mobile payment transaction, to provide data or other forms of input needed to conduct the transaction, etc.

As will be described, the payment application user interface may access the inventive architecture contained in device 102 to enable the device to perform functions or operations used in conducting a mobile payment transaction or in otherwise managing a consumer's mobile payment transaction account or transaction data. Thus in some embodiments of the present invention, the inventive architecture is installed and resides in a secure element (SE) that may be the whole or part of element 116, with some or all of the consumer's payment account data and/or payment transaction data also being stored in the secure element. Further, in some embodiments, a payment application used by a consumer to conduct a payment transaction may be installed and resident in the secure element, with a user interface application that enables a user to interact with the payment application being installed outside of the secure element. This arrangement of the functional elements and data used to conduct a payment transaction provides security for the consumer by isolating their private data from other elements of the payment device, while enabling interaction and access to that data and to the functional modules needed to conduct a variety of payment transaction operations.

Figure 2:
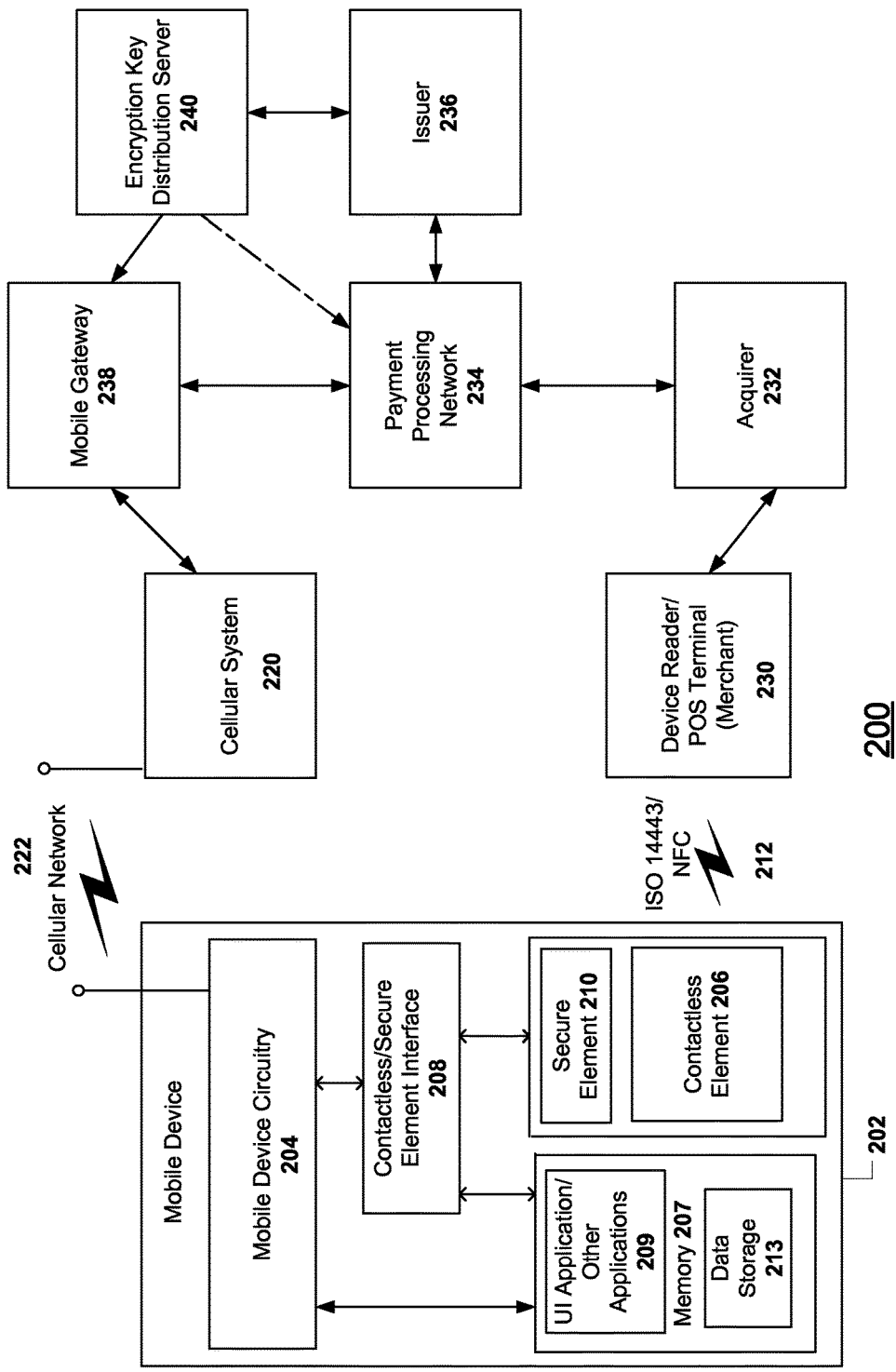
FIG. 2 is a functional block diagram illustrating the primary components of a system for executing a payment transaction using a mobile device, such as the mobile device of FIG. 1, in accordance with an embodiment of the present invention.

FIG. 2 is a functional block diagram illustrating the primary components of a system for executing a payment transaction using a mobile device, such as the mobile device of FIG. 1, in accordance with an embodiment of the present invention. As shown in FIG. 2, system 200 includes a mobile device 202 having wireless communications capabilities 222. Mobile device 202 may be a wireless mobile telephone, PDA, laptop computer, pager, etc. In a typical embodiment, mobile device 202 is a cell phone, although as noted, implementation of the present invention is not limited to this embodiment. In the case of a cell phone as the mobile device 202, the device includes mobile device (cell phone) circuitry 204 that enables certain of the telephony functions. Among other functions, mobile device circuitry 204 enables mobile device 202 to communicate wirelessly with cellular system (i.e., a wireless carrier) 220 via cellular network 222.

Mobile device 202 further includes a contactless element 206, typically implemented in the form of a semiconductor chip. Mobile device 202 further includes a secure element (SE) 210, which may be implemented in the form of a semiconductor chip or other suitable form factor. In some embodiments, secure element 210 may include one or more of a processing element (such as a CPU or microprocessor for executing stored instructions), a module or modules to enable the execution of cryptographic operations, and a secure data storage element. The secure data storage element may provide storage for instructions executed by the processing element and/or for an application or applet that is executed to provide a user with the ability to conduct mobile payments. Contactless element 206 typically includes a near field communications (NFC) data transfer (e.g., data transmission) element, such as an antenna or transducer. Contactless element 206 is typically embedded within and integrated with the elements of mobile device 202, and in some implementations, data or control instructions transmitted via cellular network 222 may be exchanged with or applied to contactless element 206 by means of contactless/secure element interface 208. Contactless/secure element interface 208 functions to permit the exchange of data and/or control instructions between mobile device circuitry 204 (and hence the cellular network) and secure element 210 or contactless element 206. Contactless element 206 may also include data storage capability in the form of a memory or secure data storage that may be accessed via interface 208 to permit the implementation of data read, write, and erase functions, for example.

Secure element 210 (or more precisely, a secure data storage region that is part of secure element 210) may be used to store operating parameters or other data utilized in the operation of the device or the conduct of a payment transaction. Secure element 210 may also be used to store other data for which enhanced security is desired, for example, payment transaction data, personal payment account data, identification data, authentication data, access control data for an application or device function, etc. Secure element 210 may be implemented in the form of a chip that is separate and apart from contactless element 206, or alternatively, may be a section of memory in a chip that forms part of contactless element 206. Note also that the secure element and/or contactless element contained within the mobile device may be a removable element or may be integrated within the mobile device. Examples of removable elements include SIM cards, flash memory cards, and other suitable devices.

Mobile device 202 may also include one or more applications 209, where applications 209 are implemented in the form of one or more of software, firmware, or hardware. Applications 209 are used to implement various functions desired by a user, where such functions may include, but are not limited to, certain eCommerce transaction operations, certain payment transaction operations, etc. Typically, applications 209 represent processes or operations that are dedicated to a specific function that provides added value to the user and which are not part of the standard operation of the device (i.e., not part of enabling the standard telephony functions, for example). For example, applications 209 may include a user interface application that is used by a consumer to conduct a mobile payment transaction by interacting with an installed payment application or applet. The core payment application or applet may interact with one or more of the other functional modules of the inventive mobile payment application architecture, where the core application and those modules are contained in secure element 210 or another form of secure data storage. The user interface application thus allows the user to initiate a payment and to interact with the core payment application (i.e., the mobile payment module or application) to conduct a transaction.

As shown in the figure, applications 209 may exchange data with secure element 210 (in some cases, via contactless/secure element interface 208, while in other implementations, such as a SIM, communication and data exchange may be accomplished directly without an intermediate interface) and may also be capable of exchanging data with mobile device circuitry 204. As noted, a typical application 209 for the purposes of the present invention is a user interface application that enables a user to utilize an installed payment application to make a payment for a transaction, where the transaction is wholly or partially conducted using the mobile device. In some embodiments, secure element 210 (or an associated secure data storage element or region) may contain user or payment application authentication data, encryption key data, user or payment account identification data, payment transaction record data, account balance data, etc. Applications 209 are typically stored as a set of executable instructions in memory 207, which may also include data storage 213. A processor accesses memory 207 to load and unload the instructions and data as needed to execute the instructions and perform the functions of the installed application(s).

Contactless element 206 is capable of transferring and receiving data using a data transfer element which implements a near field communications capability 212, typically in accordance with a standardized protocol or data transfer mechanism (identified as ISO 14443/NFC in the figure). Near field communications capability 212 is a short-range communications capability; examples include the ISO 14443 standard, RFID, Bluetooth™, infra-red, or other data transfer capability that can be used to exchange data between the mobile device 202 and a device reader or point of sale terminal 230, which is typically located at a Merchant's place of business. Thus, mobile device 202 may be capable of communicating and transferring data and/or control instructions via both cellular network 222 and near field communications capability 212.

System 200 further includes Acquirer 232 which is in communication with Merchant or Merchant's device reader or point of sale terminal 230. Acquirer 232 is in communication with Payment Processing Network 234 and may exchange data with Payment Processing Network 234 as part of a transaction authorization process. Payment Processing Network 134 is also in communication with Issuer 236. Issuer 236 may exchange data with Payment Processing Network 234 as part of a transaction authorization or transaction reconciliation process.

System 200 may also include Mobile Gateway 238, which is capable of coupling the cellular (wireless) network or system to a second network (typically a wireline network such as the Internet) and enabling communication and the transfer of data between the networks. Mobile Gateway 238 may perform data processing operations as needed to permit the efficient transfer of data between the two types of networks, including, but not limited to, data reformatting or other processing to take into account differences in network protocols. Mobile Gateway 238 may also perform data processing operations to enable more efficient and more secure data transfer between the networks and devices coupled to each type of network, such as for purposes of improving the ability of a user to utilize the received data on a mobile device. As shown in the figure, in some embodiments, Mobile Gateway 238 is coupled to Payment Processing Network 234, which is coupled to Acquirer 230. Note that other embodiments are possible, such as where Mobile Gateway 238 is coupled to Issuer 236, as well as where Acquirer 230 is coupled to Issuer 236. Similarly, Issuer 236 may include the capability of functioning as Mobile Gateway 238.

System 200 may also include Encryption Key Distribution Server 240 which is capable of communication and data transfer with Mobile Gateway 238 and Issuer 236. Encryption Key Distribution Server 240 may be used to distribute encryption keys to one or more of Mobile Gateway 238, Issuer 236, or Mobile Device 202 for the purpose of enabling the encryption and decryption of transaction data that is transferred between the Issuer and the mobile device.

In some embodiments, payment processing network 234 may be configured to enable the transport of encrypted data; if so, then Encryption Key Distribution Server 240 may be capable of communication with payment processing network 234 for the purpose of distributing an encryption key to an element of that network (as suggested by the non-solid line connecting Key Server 240 to network 234). The data encryption/decryption processes may also (or instead) be performed in Mobile Gateway 238 in accordance with the encryption key(s) distributed by Encryption Key Distribution Server 240. Note that Issuer 236 may communicate with Encryption Key Distribution Server 240 to inform server 240 which of several mobile gateways it authorizes for purposes of communicating with mobile device 202, and hence to which mobile gateway a particular set of encryption keys should be distributed. Thus, Issuer 236 may select which of multiple available mobile gateways it chooses to authorize for purposes of communicating and exchanging transaction data with a particular mobile device.

Figure 3:
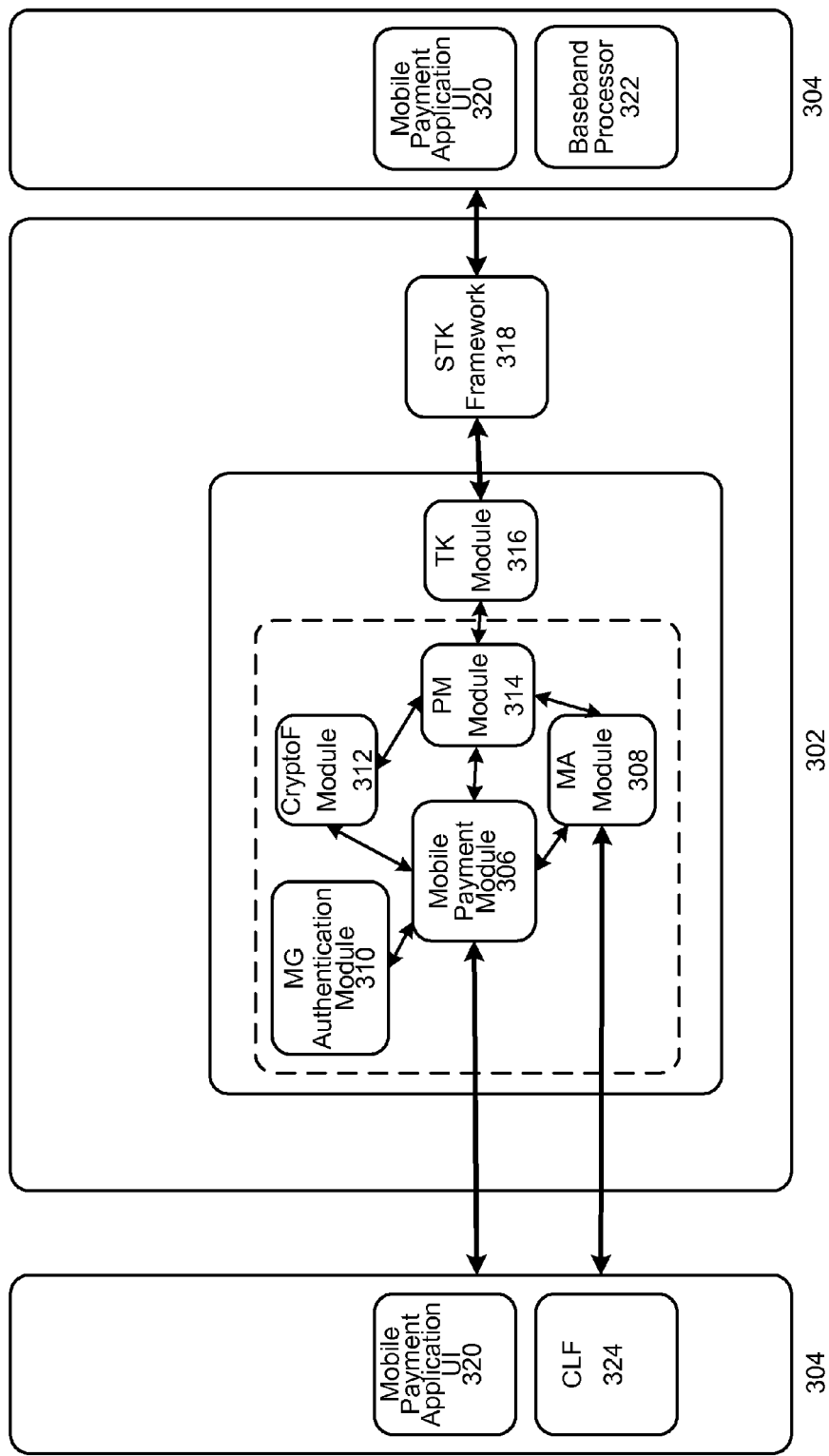
FIG. 3 is a functional block diagram illustrating the primary components of the logical architecture of the inventive mobile payment application architecture, in accordance with an embodiment of the present invention.

FIG. 3 is a functional block diagram illustrating the primary components of the logical architecture of the inventive mobile payment application architecture, in accordance with an embodiment of the present invention. As shown in the figure, in some embodiments, the inventive system design or architecture is composed of a set of functional modules that are implemented as executable instructions (or another functionally equivalent form, such as firmware, middleware, etc.) in a secure element 302. Secure element (SE) 302 represents one possible embodiment for implementing the functional modules, with other possible embodiments being a SIM card, smart card or similar element. Secure element 302 may be embedded in or otherwise part of a mobile device, such as the mobile devices depicted as elements 102 of FIG. 1 or 202 of FIG. 2. In FIG. 3, the mobile device is depicted as a handset or mobile phone 304, which for purposes of clarity has been depicted as two logical elements, with one placed on either side of secure element 302. Secure element 302 may be an element such as element 210 depicted in FIG. 2 or element 116 depicted in FIG. 1.

As noted, in some embodiments, the inventive architecture is implemented as a logical architecture or system composed of functional modules, with each module capable of performing a specific set of functions or operations that are used in conducting a mobile payment transaction or in managing a consumer account that is used for making payments using a mobile device. The inventive architecture is designed to accommodate a developing usage environment as new technologies and services become available. One way it does this is by separating the mobile payment functions into different modules to simplify the portability of the overall set of modules, and also to reduce the time and effort required to validate each module and the overall compliance of the set of modules.

In some embodiments of the present invention, the inventive architecture may include modules, applets, or classes that implement or assist in the implementation of the following functions:
  Mobile Contactless Payment Operations (as implemented by Mobile Payment Module 306), which may include one or more of:
    Magnetic Stripe Data management (MSD)
    Quick Smart Debit/Credit (qVSDC) operations
    Consumer Mobile Device Commands Processing
    Mobile Contactless Issuer Update Processing
    Mobile Contactless Payment Personalization;
  Multi-Access Function (as implemented by Multi-Access (MA) Module 308)—this module provides sharing of data between applets and other functional elements by allowing efficient use of data storage using shared objects and data structures where applicable;
  Mobile Gateway Authentication (as implemented by Mobile Gateway (MG) Authentication Module 310)—this module assists in providing a set of data and functions to enable a mobile gateway (such as that described with reference to FIG. 2) to be used as an intermediary proxy between a mobile device and a payment processing network, by coupling a cellular or wireless communications network to another network, such as the Internet;

OTA (over-the-air) Platform Connection—this function allows personalization of the application as well as updates initiated by the issuer or update requests initiated by the application through a trusted path and using the mobile operator network;

STK Interaction Processing (as implemented by Toolkit Module 316 and STK Framework 318);

Message Processing (as implemented by Process Message (PM) Module 314)—this assists in processing incoming and outgoing messages. In some embodiments, the Process Message module operates to convert messages received from a mobile gateway into commands that may be executed by the Mobile Payment Module 306 and converts responses from Module 306 into messages that may be understood by the mobile gateway;

Cryptography Functions (as implemented by Cryptography Functions (CF) Module 312)—this module assists in providing a set of functions and data to enable the secure transfer of data by executing cryptography operations on incoming or outgoing data;

Contactless Registry Services—a set of services provided by the Secure Element platform through API to manage registration of contactless services and visibility of the application over a contactless interface, as well as the priority of an application selected for use during a payment transaction; and Application Activation User Interface—a module (on the Secure Element or the Mobile Device) interfacing with the consumer for the activation/deactivation of the payment application and for setting the priority of the payment application selected for use in conducting a payment transaction, etc.

As shown in the figure, the mobile device or handset 304 may include a mobile payment application user interface application 320 which is installed outside of secure element 302 and which may be implemented in the form of a Java software midlet application. User Interface application 320 enables a consumer to conduct a mobile payment transaction using mobile device 302 and may enable a payment processing network or issuer to perform certain data processing or data transfer operations that are part of managing the consumer's payment account. In conducting a mobile payment transaction, user interface application 320 may provide a user interface to enable a consumer to conduct a payment application, and may also operate to authenticate the consumer, and to provide data to, or receive data from one or more of the modules contained in secure element 302. Mobile device or handset 304 may also include a baseband processor 322 that is used to perform certain of the device's telephony functions such as enabling communication with the cellular network. Baseband processor 322 would typically be utilized to enable over-the-air (OTA) update processing and other communications of payment transaction data over the wireless or cellular network. In addition, mobile device or handset 304 may also include a contactless payment frontend (CLF) 324 which enables device or handset 304 to perform contactless data transfer operations using a near field communications (NFC) or other short range communications capability.

In addition to enabling contactless payment transactions, the inventive architecture may also provide additional functionality, including, but not limited to:

Consumer Mobile Device Commands Processing of a set of commands defined between the handset application and the Secure Element application to authenticate the consumer, to allow protected access to cardholder data, and to allow protected access to a payment transaction log, etc; and Mobile Contactless Issuer Update Processing through the Over-the-Air (OTA) Network, Wide Area Network or presentation of the mobile device to a contactless payment terminal reader (this function permits an issuer to update or reset data stored in the mobile device that may be used to track aspects of payment transactions, to refresh the available funds, to reset the consumer verification method, etc.). A description of one possible implementation of this function may be found in the previously mentioned, U.S. application Ser. No. 12/563,421, filed, Sep. 21, 2009, entitled "Over The Air Update Of Payment Transaction Data Stored In Secure Memory".

Embodiments of the invention may provide one or more of the following ways to conduct a mobile contactless payment transaction using a contactless interface: 1) Magnetic stripe contactless payment (based on Magnetic Stripe Data, MSD); and 2) a quick Smart Debit/Credit (qVSDC) payment allowing for transactions over the contactless interface, such as those enabled by Visa, the assignee of the present application. Global interoperability may be achieved by requiring the mobile contactless application to support both MSD and qVSDC, and for readers to support either MSD or qVSDC.

The manner in which a payment device reader and the consumer mobile device interact may depend on the capabilities of the reader. If the reader supports the qVSDC functions and protocols, then a Preliminary Transaction Processing operation may consist of authenticating the consumer with the Mobile Device through an available consumer verification method, such as by requiring entry of a passcode if the preference setting requires consumer authentication prior to conducting a payment transaction or if the transaction amount is over a limit defined by the card issuer. Such an authentication process may be conducted prior to the payment transaction and may include prompting the consumer to present the mobile device to the reader. A description of one possible implementation of this type of authentication operation may be found in U.S. patent application Ser. No. 12/563,444, entitled "Method of Performing Transactions with Contactless Payment Devices Using Pre-Tap and Two-Tap Operations", filed Sep. 21, 2009, and the contents of which is hereby incorporated in its entirety by reference for all purposes.

After a mobile device capable of a contactless payment transaction is detected or otherwise discovered in the field, in some implementations the reader attempts to read the PPSE, which is a prioritized directory of supported payment applications accessible over the contactless interface. The device reader can indicate to the payment device what contactless payment transaction support modes are available (where either or both of MSD and qVSDC are typically supported). Processing of a mobile payment transaction can then be determined by an appropriate data path within the inventive architecture (which may determine the behavior of the payment application (element 320 of FIG. 3) installed on and being executed by the mobile device). As noted, embodiments of the invention can support the MSD and qVSDC processing paths (among others) where the MSD path is for regions or device readers in which a magnetic stripe data is utilized to provide the device data and the qVSDC path is for regions or device readers in which an embedded chip is utilized to provide the device data.

In some embodiments, the following commands may be supported by the inventive architecture:

Select (by name), as defined by ISO/IEC 7816-4 allows the selection of a particular payment application corresponding to a certain cardholder account which returns, among other information, the card's processing data object list;

Get Processing Options, containing terminal data requested in the card's processing data object list;

Read Record, as defined by EMV Integrated Circuit Card Specifications for Payment Systems, Book 3, Application Specification version 4.2, functions to retrieve a file record from a linear file; and Get Data, functions to retrieve a data element.

Multi-Access module 308 of FIG. 3 provides the capability for the inventive architecture to share internal data as well as consumer account and transaction data between different entry points to the architecture with a reduction in the amount of replicated data. Multi-Access module 308 may reduce the data storage or memory requirements of the device by enabling certain data to be shared between multiple applets, classes, functions or operations of the inventive mobile payment architecture. Note that in some embodiments, the following data elements may not be shared between different instances of the module, and hence may have a value for each instance of the multi-access module:

File Control Information (FCI) in the Select response data;

Application File Locator (AFL) in the Get Processing Option response data; and

Application Interchange Profile (AIP) in the Get Processing Option response data.

In some embodiments, even if these data elements contain the same or some of the same values, they are duplicated for each instance of multi-access module 308. The remaining data may be shared between other instances of the inventive architecture or set of applications shown within the dotted line of element 302 of FIG. 3.

Figure 4:
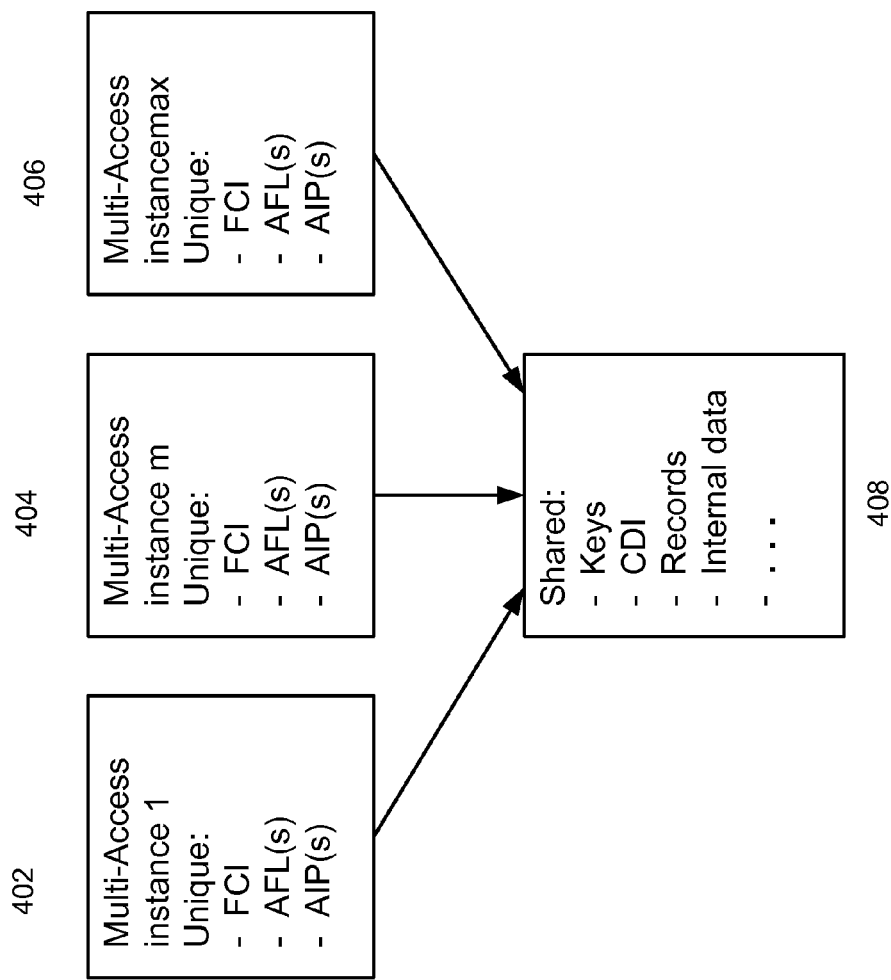
FIG. 4 is a diagram illustrating how the multi-access (MA) applet can provide an efficient way to store and access consumer and/or payment account or payment transaction data that may be used by multiple modules, in accordance with an embodiment of the invention.

FIG. 4 is a diagram illustrating how the multi-access (MA) module 308 can provide an efficient way to store and access consumer and/or payment account or payment transaction data that may be used by multiple modules, in accordance with an embodiment of the invention. The figure depicts how data may be distributed between multiple Multi-Access instances and the underlying architectural component object(s). As shown in the figure, each instance of the multi-access module (labeled "Multi-Access instance 1" (element 402), "Multi-Access instance m" (element 404), and "Multi-Access instancemax" (element 406)) in the figure is characterized by unique values for the File Control Information (FCI), Application File Locator (AFL), and Application Interchange Profile (AIP) that correspond to that instance. It should be noted that the FCI, AFL, and AIP are shown as examples of the unique data that may be associated with each instance of the multi-access module, and that in some embodiments, only some of these unique data types (either alone or in addition to other data types) may be present in each instance. Each instance 402, 404, 406 is associated with a common set of other values or data 408, such as common or shared encryption keys, transaction records, or internal data. The use of the multi-access module instances and common data 408 in this way enables the inventive architecture to conserve data processing and data storage resources while permitting use of the functional modules depicted in FIG. 3 with multiple consumer payment accounts. For example, in the case where each consumer payment account (e.g., debit, credit, money transfer, etc.) is represented by a unique multi-access instance, the inventive architecture provides a resource efficient way to enable each account to utilize a common set of data and functional modules as needed to implement a range of possible transactions and transaction operations. In another example, each type or class of a debit account (e.g., domestic or international) may be represented by a unique multi-access instance, and similarly for credit or other forms of accounts.

In another example, the use of a multi-access module and common data may enable the use of a single counter for multiple cardholder accounts (where in such an example, the counter might be represented by data stored in the common, shared data object which can be updated by more than one instance of the multi-access module). In this example, each instance of the multi-access module may represent a different consumer account, type of account, or sub-type within a type of account (e.g., debit, credit, domestic, international, ATM (automatic teller machine), etc.), with each account being able to access and update a common counter. This arrangement may permit efficient tracking of certain consumer account characteristics that are of interest in terms of the entire set of consumer accounts, rather than just for each individual account. For example, an issuer may want to track the total number of transactions that a consumer engages in, the total value of all transactions, the total number of transactions of a certain category, etc., where this number is desired as a total for all of the consumer's accounts (e.g., in order to provide better fraud control, marketing of new services, etc.).

Returning to the functional modules depicted in FIG. 3, as noted, embodiments of the invention can support a Mobile Gateway Authentication (MG) function (as implemented using Mobile Gateway Authentication Module 310). This function implements a mutual authentication operation between the inventive architecture and a Mobile Gateway prior to authorizing the Gateway or the Toolkit Module 316 to forward an Issuer Scripting Request. Note that in this situation, the Toolkit Module may provide a direct connection between a Mobile Gateway and the secure element mobile payment application to enable issuer updates. This may enable an issuer (through the intermediary of a payment processing network) to implement an account update, counter refresh, consumer verification method (such as passcode) reset or update, application enable/disable, etc., without the need for an intermediate application on the Mobile Device or for interaction with the consumer.

In some embodiments, the Process Message Module (element 314 of FIG. 3) functions to convert a message received from a Mobile Gateway into APDU commands and forwards it to Mobile Payment Module 306. Process Message Module 314 may also convert the response of the APDU commands received from Mobile Payment Module 306 into an appropriate Mobile Gateway message format.

FIG. 5 is a diagram illustrating a possible functional architecture for use in conducting and processing mobile payment transactions that may be used with the inventive mobile payment architecture. As shown in the figure, the overall functional architecture may include a set of consumer services 502, a set of access services 504, a proximity platform 506, and supporting data processing and information systems 508. As shown in the figure, the users of some or all of the services may include a Merchant Store 510, an Issuer 512, and a consumer 514.

Consumer services 502 include those architectural elements or services with which a consumer interacts when conducting or attempting to conduct a payment transaction. Such elements or services may include, for example, a merchant point of sale terminal (identified as "Merchant Terminal" in the figure. The consumer may interact with the merchant terminal using a contact or contactless mode of operation, depending on the configuration and functionality of the consumer mobile device and the mobile payment application and mobile payment architecture available in the mobile device. Consumer Services 502 may include services or functions provided by one or more issuers of the consumer's payment accounts (identified as "Issuer's Consumer Services"), and which may include services such as enrollment, consumer verification method set up, etc. Consumer Services 502 may further include TSM Services, which typically include the provisioning of the application (for the Mobile Device and Secure Element), personalization of the applications, life cycle management of the Mobile Device and Secure Element applications, etc.

Consumer Services 502 and the elements responsible for enabling a consumer to utilize those services may interact with Access Services 504 to enable a payment transaction to be conducted. Access Services 504 may include services provided or enabled by a Mobile Gateway (thereby enabling communication and data transfer between the mobile payment device and a network such as the Internet), services provided by a Partner Network of the payment processing network used for the payment transaction, and Client Common services such as access for managing and administration of Proximity Service for Issuers, etc.

Proximity Platform 506 represents services that provide Issuer Administration Services such as proximity application preferences management for issuers, (Visa) Personalization Assistant for Issuers and Trusted Service Manager providers, (Visa) Partner Services to provide access to specifications and implementation guidelines for proximity related material for partners, and Proximity Payment Services to provide parsers and builders for mobile message communication with the mobile application on a consumer's device and integration facilities for exchanging scripts between a mobile application and issuer systems through a payment processing network.

Processing and Information Systems services 508 represent services that provide backend data processing and data access for conducting payment transactions and providing added-value services to a consumer. One or more of these services may be provided by a payment processing network responsible for processing data related to a payment transaction and communicating with an issuer or acquirer in order to authorize the transaction. These services may include data storage for transaction records and data related to the consumer (as suggested by the element labeled "Data Warehouse" in the figure), dispute resolution services (as suggested by the element labeled "Dispute" in the figure), account billing services for transaction billing (as suggested by the element labeled "Billing" in the figure), value-added services such as providing alerts and notifications related to transactions (as suggested by the element labeled "Alerts/Notifications" in the figure), or other typical services related to the processing and execution of payment transactions (as suggested by the element labeled "Transaction Services" in the figure) such as verifying and forwarding an authorization message to the issuer and returning the authorization response back, providing clearing and settlement services, fraud detection, etc.

In a typical use case, a mobile payment application user interface application (represented, for example, by element 320 of FIG. 3) is installed in a mobile device 304. The user interface application may be used by a consumer to conduct a payment transaction using the mobile device. In some embodiments, the installed user interface application may be activated or otherwise made available to the consumer in response to interaction with a point of sale terminal (POS), where the interaction may be performed in a contact or in a contactless mode. In other embodiments, the mobile payment application and/or payment application user interface may be activated or otherwise made available to the consumer by means of a user interface or other method of permitting the consumer to perform an operation that launches or activates the mobile payment application or payment application user interface.

After the mobile payment application user interface application is activated, it communicates with Mobile Payment Module 306 (as suggested by the arrow connecting elements 320 and 306 in FIG. 3). This permits mobile payment application user interface 320 and Mobile Payment Module 306 to exchange messages and data between the two elements. As shown in FIG. 3, mobile payment application user interface 320 resides outside of secure element 302, with Mobile Payment Module 306 residing within secure element 302. This architectural design permits updates, revisions, or even replacement of mobile payment application user interface 320 to be made without impacting the contents or operation of secure element 302. In such a situation, Mobile Gateway Authentication Module 310 and/or CF Module 312 may be used to enable authentication and/or validation of any updates, revisions, or replacements of application 320. Similarly, Mobile Gateway Authentication Module 310 and/or CF Class 312 may be used to authenticate and/or validate other applications or functional modules that are sought to be installed in secure element 302 or other parts of the payment device. The inventive architecture also permits sensitive data (such as transaction records, encryption keys, consumer authentication data, etc.) to be stored in secure element 302 and made accessible for use in conducting a mobile payment transaction, without the possibility of the data being corrupted, or of an unauthorized party accessing the data as the result of the operation of other applications or elements of the mobile device 304.

Mobile Payment Module 306 acts as the primary entry point for messaging and the exchange of data with mobile payment application user interface 320. In this role, Mobile Payment Module 306 may exchange data or cause the execution of data processing or data access operations by other of the modules contained in secure element 302. For example, in executing the functions or operations used to allow a consumer to conduct a payment transaction using a mobile device, Mobile Payment Module 306 may communicate with Mobile Gateway Authentication Module 310 to determine the appropriate mobile gateway to use for a particular transaction, or to obtain data used to authenticate the mobile gateway. Similarly, Mobile Payment Module 306 may communicate with CF Module 312 in order to execute functions or operations related to the encryption or decryption of data or messages. Mobile Payment Module 306 may communicate with PM Module 314 to translate or convert messages (as needed) between the formats used by Mobile Payment Module 306 and a mobile gateway. Further, MA (multi-access) Module 308 may communicate with Mobile Payment Module 306 to obtain data used to conduct a payment transaction using a specific consumer account. Note that as shown in FIG. 3, Contactless Front End (CLF) 324 may also communicate with MA Module 308 as part of conducting a payment transaction using a contactless mode of operation. In such a situation, CLF 324 may interact with MA Module 308 to conduct the payment transaction using a specific consumer account, where data or information for that account is stored as an instance of Module 308.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer, computing device or data processing device that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. An apparatus for conducting a payment transaction, comprising:
    a mobile device;
    an electronic processor configured to execute a set of instructions, wherein the electronic processor is incorporated into the mobile device;
    a mobile payment application user interface on the mobile device;
    a secure element incorporated into the mobile device, wherein the secure element is secure at least with respect to a user of the mobile device;
    a user interface application installed on the mobile device, wherein the user interface application is external to the secure element, and wherein the user interface application includes instructions which, when executed by the electronic processor, generate a user interface enabling the user of the mobile device to interact with a mobile payment module; and
    a plurality of functional modules installed in the secure element, wherein the plurality of modules includes:
        the mobile payment module, the mobile payment module interacting with the mobile payment application user interface which is outside of the secure element, including instructions which, when executed by the electronic processor, enable the user of the mobile device to conduct a payment transaction;
        a mobile gateway authentication module, the mobile gateway authentication module including instructions which, when executed by the electronic processor, mutually authenticate a mobile gateway and the mobile payment module;
        an over the air communication and data transfer module, the over the air communication and data transfer module including instructions which, when executed by the electronic processor, transfer data and commands to conduct the payment transaction between a cellular network and the mobile device;
        a process message module, the process message module including instructions which, when executed by the electronic processor, convert messages received from the mobile gateway into commands that are executable by other of the plurality of functional modules and to convert responses from the other of the plurality of functional modules into messages that are understood by the mobile gateway; and
        a multi-access module, the multi-access module including instructions which, when executed by the electronic processor, maintain a plurality of multi-access instances at the mobile device, wherein each of the plurality of multi-access instances represents a unique financial account of a plurality of financial accounts of the user of the mobile device, wherein each of the multi-access instances includes unique data, wherein the multi-access module maintains non-unique shared data such that each of the plurality of multi-access instances including unique data shares the non-unique shared data with the other multi-access instances whereby a storage requirement for the plurality of instances of the multi-access module is reduced, and wherein the non-unique shared data includes a counter that is updated when the payment transaction is conducted using any of the plurality of financial accounts represented by the plurality of multi-access instances.

2. The apparatus of claim 1, wherein the non-unique shared data further comprises one or more of: cryptographic keys, data used for a consumer verification, account related data, and payment transaction data.

3. The apparatus of claim 1, further comprising a cryptography function module, wherein the cryptography function module includes instructions which, when executed by the electronic processor, encrypt or decrypt data or messages.

4. The apparatus of claim 1, wherein a first instance of the plurality of multi-access instances corresponds to a domestic account of the user of the mobile device and a second instance of the plurality of multi-access instances corresponds to an international account of the user of the mobile device.

5. The apparatus of claim 1, wherein the secure element is secured at least in part by requiring that external access to the secure element is performed with a defined set of access commands.

6. The apparatus of claim 5, wherein the defined set of access commands is in accordance with at least one of the ISO 7816 series of standards.

7. The apparatus of claim 5, wherein the defined set of access commands comprises a select command that selects a particular financial account of the plurality of financial accounts stored on the secure element.

8. The apparatus of claim 7, wherein select command response data includes file control information.

9. The apparatus of claim 8, wherein the unique data of each of the multi-access instances maintained by the multi-access module comprises interchange profile data.

10. The apparatus of claim 5, wherein the defined set of access commands comprises a get processing options command that obtains options with respect to accessing the secure element, and wherein get processing options command response data contains at least one of: file location data with respect to a selected financial account, and interchange profile data with respect to processing capabilities of the secure element.

11. The apparatus of claim 1, wherein fraud control with respect to the plurality of financial accounts of the user of the mobile device is based at least in part on the counter.

12. A method of conducting a payment transaction, comprising:
maintaining, by a multi-access module installed in a secure element of a mobile device, a plurality of multi-access instances, wherein each of the plurality of multi-access instances represents a unique financial account of a plurality of financial accounts of a user of the mobile device, wherein each of the plurality of the multi-access instances includes unique data and non-unique shared data, and wherein the multi-access module maintains the non-unique shared data such that each of the plurality of multi-access instances including unique data shares the non-unique shared data with the other multi-access instances whereby a storage requirement for the plurality of multi-access instances of the multi-access module in the secure element is reduced;
maintaining, by the multi-access module installed in the secure element of the mobile device, a counter as part of the non-unique shared data of the multi-access module;
performing, by a mobile payment module installed in the secure element of the mobile device via a mobile payment application user interface which is outside of a mobile payment application, a first payment transaction with respect to a first financial account of the plurality of financial accounts of the user of the mobile device, the first financial account corresponding to a first multi-access instance of the plurality of multi-access instances;
updating, by the first multi-access instance installed in the mobile device, the counter based at least in part on the first payment transaction;
performing, by the mobile payment module installed in the secure element of the mobile device via the mobile payment application user interface which is outside of the mobile payment application, a second payment transaction with respect to a second financial account of the plurality of financial accounts of the user of the mobile device, the second financial account corresponding to a second multi-access instance of the plurality of multi-access instances;
updating, by the second multi-access instance installed in the mobile device, the counter based at least in part on the second payment transaction; and
providing, by the multi-access module installed in the secure element of the mobile device, a value of the counter to enable multi-account functionality.

13. The method of claim 12, wherein the first multi-access instance of the plurality of multi-access instances corresponds to a domestic financial account of the user of the mobile device and the second multi-access instance of the plurality of multi-access instances corresponds to an international financial account of the user of the mobile device.

14. The method of claim 12, wherein the counter indicates a total number of transactions conducted using any of the plurality of financial accounts of the user of the mobile device.

15. The method of claim 12, wherein the counter indicates a total value of transactions conducted using any of the plurality of financial accounts of the user of the mobile device.

16. The method of claim 12, wherein the counter counts a total number of transactions across the plurality of financial accounts of the user of the mobile device.

17. The method of claim 12, wherein the counter counts a total value of transactions across the plurality of financial accounts of the user of the mobile device.

18. The method of claim 12, wherein the counter counts a total number of transactions in a particular transaction category of a plurality of transaction categories across the plurality of financial accounts of the user of the mobile device.

19. The method of claim 12, wherein providing the value of the counter enables multi-account functionality including multi-account fraud control.

20. The method of claim 12, wherein providing the value of the counter enables multi-account functionality including multi-account marketing.

21. The method of claim 12, further comprising:
receiving, with a toolkit module installed in the secure element of the mobile device, a scripting request from a source external to the secure element of the mobile device; and
responsive to receiving the scripting request, refreshing the counter maintained by the multi-access module.

22. One or more non-transitory computer readable media collectively storing instructions for conducting a payment transaction, which when executed by one or more processors of a computer system, collectively cause the computer system to perform operations comprising:
maintaining, by a multi-access module installed in a secure element of a mobile device, a plurality of multi-access instances, wherein each of the plurality of multi-access instances represents a unique financial account of a plurality of financial accounts of a user of the mobile device, wherein each of the plurality of the multi-access instances includes unique data and non-unique shared data, and wherein the multi-access module maintains the non-unique shared data such that each of the plurality of multi-access instances including unique data shares the non-unique shared data with the other multi-access instances whereby a storage requirement for the plurality of multi-access instances of the multi-access module in the secure element is reduced;
maintaining, by the multi-access module installed in the secure element of the mobile device, a counter as part of the non-unique shared data of the multi-access module;
performing, by a mobile payment module installed in the secure element of the mobile device via a mobile payment application user interface which is outside of a mobile payment application, a first payment transaction with respect to a first financial account of the plurality of financial accounts of the user of the mobile device, the first financial account corresponding to a first multi-access instance of the plurality of multi-access instances;
updating, by the first multi-access instance installed in the mobile device, the counter based at least in part on the first payment transaction;

performing, by the mobile payment module installed in the secure element of the mobile device via the mobile payment application user interface which is outside of the mobile payment application, a second payment transaction with respect to a second financial account of the plurality of financial accounts of the user of the mobile device, the second financial account corresponding to a second multi-access instance of the plurality of multi-access instances;

updating, by the second multi-access instance installed in the mobile device, the counter based at least in part on the second payment transaction; and providing, by the multi-access module installed in the secure element of the mobile device, a value of the counter to enable multi-account functionality.

* * * * *